United States Patent Office 3,268,567
Patented August 23, 1966

3,268,567
METAL COORDINATION COMPLEX OF O-HY-
DROXYBENZALAMINODIPHENYLAMINE
Henryk A. Cyba, Evanston, Ill., assignor to Universal Oil
Products Company, Des Plaines, Ill., a corporation of
Delaware
No Drawing. Original application Oct. 27, 1961, Ser. No.
148,021, now Patent No. 3,216,969, dated Nov. 9, 1965.
Divided and this application Dec. 18, 1964, Ser. No.
419,590
4 Claims. (Cl. 260—429.9)

This is a division of copending application Serial No. 148,021 filed October 27, 1961, now Patent No. 3,216,969, and relates to a novel composition of matter. More particularly the novel composition of matter comprises o-hydroxybenzalaminodiphenylamine and metal coordination complexes thereof. These compounds are particularly advantageous for use as additives to solid polymers to inhibit deterioration thereof caused by oxidation and ultraviolet light.

It is well known that solid polymers undergo deterioration when exposed to sunlight and air. The deterioration due to sunlight and the deterioration due to oxygen are separate phenomena as evidenced by the fact that either one may occur in the absence of the other. It may be that deterioration from one source enhances the deterioration from the other source. In any event, it is important that both forms of deterioration be inhibited, and the present invention provides a novel method for accomplishing this.

Recent advances in polymer technology have made available a large variety of solid polymers. In general, the solid polymer is defined as a substance of high molecular weight, composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple condensation of an unsaturated monomer. Most, if not all, of the solid polymers undergo deterioration when exposed to sunlight and air, and such deterioration is inhibited by means of the novel additives of the present invention.

The novel additives of the present invention are particularly applicable to the stabilization of solid olefin polymers. These may comprise homopolymers or copolymers of olefinic hydrocarbons including particularly polyethylene, polypropylene, and polybutylene, as well as copolymers of ethylene and propylene, ethylene and butylene and propylene and butylene. In addition, solid polymers prepared from one or more higher molecular weight olefins may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused both by sunlight and air.

The solid olefin polymer may be fabricated into any desired finished product, including moldings, fibers, films, sheets, tubing or other shapes.

Another solid polymer available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in a small amount of divinylbenzene. The polystyrene type resins are particularly useful in the manufacture of molded or machine articles which find application in such goods as windows, optical goods, automobile panels, molded household articles, etc. One disadvantage of polystyrene is its tendency to deteriorate when exposed to air and direct sunlight for extended periods of time.

Another class of solid polymers available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to air and sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other solid polymers being used commercially on a large scale are in the textile class and include nylon (polyamide), Perlon L or 6-Nylon (polyamide), Dacron terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light and oxidation.

Still other solid polymers are prepared from other monomers and are available commercially. Illustrative examples of such other solid polymers include phenol-formaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna-N (copolymer of butadiene and acrylonitrile), butyl rubber (copolymer of butadiene and isobutylene), neoprene rubber (chloroprene polymer), Thiokol rubber (polysulfide), silicone rubber, etc. Another type of rubber is a copolymer of ethylene and propylene or ethylene and butylene, which can be cured with organic peroxides or trichloromelamine, trichlorosulfonylchloride, quinonechlorimide or any other suitable curing agent. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

As hereinbefore set forth, the novel additive of the present invention is used to inhibit deterioration of solid polymers when exposed to oxygen and ultraviolet light. The solid polymer may be prepared in any suitable manner and in most cases will contain residual unsaturation. When the solid polymer undergoes deterioration by oxygen and/or ultraviolet light, such deterioration is inhibited in accordance with the present invention.

In one embodiment the present invention relates to a compound selected from the group consisting of o-hydroxybenzalaminodiphenylamine and metal coordination complexes thereof.

The novel compound of the present invention is an o-hydroxybenzalaminodiphenylamine or a metal coordination complex thereof. Any suitable o-hydroxybenzalaminodiphenylamine may be used in accordance with the present invention and may be prepared in any suitable manner. In one method it is prepared by the reaction of aminodiphenylamine with an o-hydroxybenzaldehyde. Aminodiphenylamine may be obtained from any suitable source or may be prepared in any suitable manner. The aminodiphenylamine may be o-aminodiphenylamine or p-aminodiphenylamine and may contain one or more substituents attached to one or both of the phenyl rings. When only one substituent is attached to the aminodiphenylamine, it preferably is attached to the phenyl ring which does not contain the second nitrogen atom and also preferably is attached in the position para to the nitrogen atom linking the phenyl rings, although in some cases it may be attached in the ortho or metal positions. When two substituents are attached to the phenyl ring not containing the second nitrogen atom, the substituents preferably are in the ortho and para positions to the nitrogen linking the phenyl rings although, here again, they may be attached in the ortho and meta, meta and para or in other positions such as the 2,5, 2,6, 3,5 or 3,6 positions.

In one embodiment the substituent attached to the aminodiphenylamine is a hydrocarbon substituent and preferably is selected from alkyl and cycloalkyl groups. Illustrative examples containing alkyl substituents include p-methyl-p'-aminodiphenylamine,
p-ethyl-p'-aminodiphenylamine,
p-propyl-p'-aminodiphenylamine,
p-butyl-p'-aminodiphenylamine,
p-pentyl-p'-aminodiphenylamine,
p-hexyl-p'-aminodiphenylamine,
p-heptyl-p'-aminodiphenylamine,
p-octyl-p'-aminodiphenylamine,
p-nonyl-p'-aminodiphenylamine,
p-decyl-p'-aminodiphenylamine,
p-undecyl-p'-aminodiphenylamine,
p-dodecyl-p'-aminodiphenylamine,
p-tridecyl-p'-aminodiphenylamine,
p-tetradecyl-p'-aminodiphenylamine,
p-pentadecyl-p'-aminodiphenylamine,
p-hexadecyl-p'-aminodiphenylamine,
p-heptadecyl-p'-aminodiphenylamine,
p-octadecyl-p'-aminodiphenylamine,
p-nonadecyl-p'-aminodiphenylamine,
p-eicosyl-p'-aminodiphenylamine, etc.,
p-methyl-o-aminodiphenylamine,
p-ethyl-o-aminodiphenylamine,
p-propyl-o-aminodiphenylamine,
p-butyl-o-aminodiphenylamine,
p-pentyl-o-aminodiphenylamine,
p-hexyl-o-aminodiphenylamine,
p-heptyl-o-aminodiphenylamine,
p-octyl-o-aminodiphenylamine,
p-nonyl-o-aminodiphenylamine,
p-decyl-o-aminodiphenylamine,
p-undecyl-o-aminodiphenylamine,
p-dodecyl-o-aminodiphenylamine,
p-tridecyl-o-aminodiphenylamine,
p-tetradecyl-o-aminodiphenylamine,
p-pentadecyl-o-aminodiphenylamine,
p-hexadecyl-o-aminodiphenylamine,
p-heptadecyl-o-aminodiphenylamine,
p-octadecyl-o-aminodiphenylamine,
p-nonadecyl-o-aminodiphenylamine,
p-eicosyl-o-aminodiphenylamine.

Illustrative examples containing two alkyl substituents include 2,4-dimethyl-4'-aminodiphenylamine,
2-methyl-4-ethyl-4'-aminodiphenylamine,
2-ethyl-4-methyl-4'-aminodiphenylamine,
2,4-diethyl-aminodiphenylamine,
2-methyl-4-propyl-4'-aminodiphenylamine,
2-propyl-4-methyl-4'-aminodiphenylamine,
2,4-dipropyl-4'-aminodiphenylamine,
2-methyl-4-butyl-4'-aminodiphenylamine,
2-ethyl-4-butyl-4'-aminodiphenylamine,
2-propyl-4-butyl-4'-aminodiphenylamine,
2-butyl-4-methyl-4'-aminodiphenylamine,
2-butyl-4-ethyl-4'-aminodiphenylamine,
2-butyl-4-propyl-4'-aminodiphenylamine,
2,4-dibutyl-4'-aminodiphenylamine, and similarly substituted compounds in which the substituents are selected from alkyl groups containing from 5 to 20 or more carbon atoms each or mixtures of these with those containing from 1 to 4 carbon atoms each. Illustrative examples containing cycloalkyl substituents include p-cyclohexyl-p'-aminodiphenylamine, 2,4-dicyclohexyl-4'-aminodiphenylamine, etc., and similarly substituted aminodiphenylamines in which the cycloalkyl group is selected from cyclopropyl, cyclobutyl, cyclopentyl and cycloheptyl groups. In another embodiment the substituents may comprise a mixture of cycloalkyl groups or a mixture of cycloalkyl and alkyl groups. Also, it is understood that similarly substituted o-aminodiphenylamines may be used in accordance with the present invention.

In another embodiment the substituents attached to the aminodiphenylamine comprises an alkoxy group and preferably is selected from methoxy, ethoxy, propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy, eicosoxy, etc. Here again the alkoxy substituent preferably is on the phenyl ring not containing the second nitrogen atom and is in the position para to the nitrogen atom linking the phenyl rings. Also, two or more alkoxy groups or one or more alkoxy groups and one or more alkyl groups may be attached to the aminodiphenylamine, these groups preferably being selected from those specifically hereinabove set forth.

In still another embodiment the substituent attached to the aminodiphenylamine may comprise a cyclic substituent including phenyl as in such compounds as N-(p-a_.iophenyl)-naphthylamine, N-(o-aminophenyl)-naphthylamine, etc. Here again the naphthyl ring may contain one or more substituents attached thereto, the substituent or substituents preferably being selected from the alkyl and alkoxy groups hereinbefore specifically set forth. In still another embodiment the substituent attached to the aminodiphenylamine may comprise an ether, thioether or amino group as illustrated, for example, by compounds as p-amino-p'-phenoxydiphenylamine,
p-amino-p'-toloxydiphenylamine,
p-amino-p'-xyloxydiphenylamine,
p-amino-p'-ethyl-phenoxydiphenylamine,
p-amino-p'-propylphenoxydiphenylamine,
p-amino-p'-butylphenoxydiphenylamine, etc.,
p-amino-p'-phenylthioxodiphenylamine,
p-amino-p'-tolylthioxodiphenylamine,
p-amino-p'-xylylthioxodiphenylamine,
p-amino-p'-ethylphenylthioxodiphenylamine,
p-amino-p'-diethylphenylthioxodiphenylamine,
p-amino-p'-propylphenylthioxodiphenylamine,
p-amino-p'-butylphenylthioxodiphenylamine, etc.,
p-amino-p'-phenylaminodiphenylamine,
p-amino-p'-tolylaminodiphenylamine,
p-amino-p'-xylylaminodiphenylamine,
p-amino-p'-ethylphenylaminodiphenylamine,
p-amino-p'-diethylphenylaminodiphenylamine, p-amino-p'-propylphenylaminodiphenylamine,
p-amino-p'-butylphenylaminodiphenylamine, etc.

It is understood that similarly substituted o-aminodiphenylamines may be used in accordance with the present invention and that the alkyl groups specifically mentioned immediately above are illustrative of groups containing three carbon atoms and that these may be replaced by alkyl groups containing up to twenty or more carbon atoms each.

In still another embodiment the substituent or substituents attached to the aminodiphenylamine may contain a halogen and preferably chlorine or bromine, a nitro group and/or a carboxylic acid ester group. It is understood that the substituted aminodiphenylamines hereinbefore set forth are illustrative and not limiting and that any suitable substituted aminodiphenylamine may be used in accordance with the present invention.

As hereinbefore set forth, the aminodiphenylamine is reacted with an o-hydroxybenzaldehyde. In one embodiment salicylaldehyde is used as a reactant. In another embodiment a substituted o-hydroxybenzaldehyde is employed including particularly ortho-vanillin (2-hydroxy-3-methoxybenzaldehyde). Other substituted o-hydroxybenzaldehydes include 2-hydroxy-3-methylbenzaldehyde,
2-hydroxy-3-ethylbenzaldehyde,
2-hydroxy-3-propylbenzaldehyde,
2-hydroxy-3-butylbenzaldehyde,
2-hydroxy-3-pentylbenzaldehyde,
2-hydroxy-3-hexylbenzaldehyde,
2-hydroxy-3-heptylbenzaldehyde,
2-hydroxy-3-octylbenzaldehyde,
2-hydroxy-3-nonylbenzaldehyde,
2-hydroxy-3-decylbenzaldehyde,
2-hydroxy-3-undecylbenzaldehyde,
2-hydroxy-3-dodecylbenzaldehyde,
2-hydroxy-3-tridecylbenzaldehyde,
2-hydroxy-3-tetradecylbenzaldehyde,
2-hydroxy-3-pentadecylbenzaldehyde,
2-hydroxy-3-hexadecylbenzaldehyde,
2-hydroxy-3-heptadecylbenzaldehyde,
2-hydroxy-3-octadecylbenzaldehyde,
2-hydroxy-3-nonadecylbenzaldehyde,
2-hydroxy-3-eicosylbenzaldehyde, etc.,
2-hydroxy-3-ethoxybenzaldehyde,
2-hydroxy-3-propoxybenzaldehyde,
2-hydroxy-3-butoxybenzaldehyde,
2-hydroxy-3-pentoxybenzaldehyde,
2-hydroxy-3-hexoxybenzaldehyde,
2-hydroxy-3-heptoxybenzaldehyde,
2-hydroxy-3-octoxybenzaldehyde,
2-hydroxy-3-nonoxybenzaldehyde,
2-hydroxy-3-decoxybenzaldehyde,
2-hydroxy-3-undecoxybenzaldehyde,
2-hydroxy-3-dodecoxybenzaldehyde,
2-hydroxy-3-tridecoxybenzaldehyde,
2-hydroxy-3-tetradecoxybenzaldehyde,
2-hydroxy-3-pentadecoxybenzaldehyde,
2-hydroxy-3-hexadecoxybenzaldehyde,
2-hydroxy-3-heptadecoxybenzaldehyde,
2-hydroxy-3-octadecoxybenzaldehyde,
2-hydroxy-3-nonadecoxybenzaldehyde,
2-hydroxy-3-eicosoxybenzaldehyde, etc.

The alkyl and/or alkoxy substituents hereinbefore set forth are generally preferred in one embodiment of the invention. However, it is understood that the alkyl or alkoxy substituent may be positioned in the 4, 5 or 6 position on the phenyl ring and that two or more of these substituents may be attached to the phenyl ring. In another embodiment, in addition to or in place of the alkyl and/or alkoxy groups, other substituents may be attached to the phenyl ring of the benzaldehyde and such substituents may comprise cyclic, cyclic-oxy, cyclic-thioxy or cyclic-amino substitutes, and/or may contain halogen and particularly chlorine or bromine, a nitro group, and/or a carboxylic acid or ester group, as specifically hereinbefore set forth in the description of the substituted aniline.

The reaction of the aminodiphenylamine with the o-hydroxybenzaldehyde is effected in any suitable manner. In one method the aminodiphenylamine is commingled with the o-hydroxybenzaldehyde at room temperature with stirring. In still another method the reaction is effected by refluxing the reaction mixture. For ease in handling, the aminodiphenylamine and the o-hydroxybenzaldehyde are prepared as separate solutions in a suitable solvent including alcohol and particularly methanol, ethanol, propanol, butanol, etc., ether, benzene, toluene, xylene, etc. The o-hydroxybenzalaminodiphenylamine precipitates as crystals and then preferably is washed and dried prior to use.

In one embodiment of the invention the novel compound is an o-hydroxybenzalaminodiphenylamine. When prepared from p-aminodiphenylamine and salicylaldehyde, the compound is salicylal-p-aminodiphenylamine. Similarly, when prepared from o-aminodiphenylamine and salicyladehyde, the inhibitor is salicylal-o-aminodiphenylamine. When prepared from substituted aminodiphenylamines and/or substituted salicylaldehydes, the inhibitor will contain the substituents introduced by such starting materials.

In another embodiment the inhibitor is a metal coordination complex of the o-hydroxybenzalaminodiphenylamine. Particularly preferred metals are nickle, copper and cobalt. Other metals include antimony, cadmium, lead, tin, uranium ($UO_2$), vanadium and zinc. Any suitable metal compound may be used in preparing the coordination complex. A preferred compound of nickel is nickel acetate tetrahydrate. Other soluble salts of nickel may be used. Other nickel salts include nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

Soluble compounds of cadmium include cadmium acetate trihydrate, cadmium chloride hydrate, cadmium formate, cadmium nitrate tetrahydrate, cadmium salicylate hydrate, etc. Soluble salts of lead include lead acetate, lead caprate, lead caproate, etc. Soluble compounds of tin include stannous chloride dihydrate, stannic sulfate dihydrate, stannous tartrate, etc. Soluble compounds of zinc include zinc acetate, zinc bromide, zinc chloride, zinc iodide, zinc nitrate, zinc salicylate, etc.

In another embodiment any valences of the metal in excess of two may be satisfied by other groups including hydrocarbon, hydroxy, alkoxy, halogen, etc. For example, the tin compound used in forming the coordination complex may comprise dialkyl tin compounds such as dimethyl tin dichloride, dilauryl tin dichloride, diphenyl tin dichloride, dibenzyl tin dichloride, phenyl tin trichloride, tributyl tin chloride, triphenyl tin chloride, tribenzyl tin chloride, divinyl tin dichloride, diacetoxy tin dichloride, triacetoxy tin chloride, etc. Suitable similarly substituted compounds of other metals may be employed.

The o-hydroxybenzalaminodiphenylamine is reacted with the metal compound in any suitable manner. For example, salicylal-p-aminodiphenylamine in alcoholic solution is refluxed with nickel acetate tetrahydrate in alcoholic solution and alkali metal hydroxide alcoholic solution. When desired, the reaction may be effected at a lower temperature which generally is not below room temperature. As mentioned above, any suitable soluble salt of the metal may be employed and any suitable solvent may be used. Preferred alkali metal hydroxides comprise sodium hydroxide and potassium hydroxide, although other alkali metal hydroxide solutions may be used.

It is understood that a number of different inhibitors may be prepared and used in accordance with the present invention and that all of these are not necessarily equivalent in the same or different solid polymer.

The novel compound of the present invention is incorporated in the solid polymer in a stabilizing concentration, which may range from about 0.05% to about 10% by weight and preferably from about 0.5% to about 2% by weight of the solid polymer. The inhibitor may be incorporated in the polymer in any suitable manner and at any suitable stage of preparation. Because the inhibitor may inhibit polymerization of the monomer, it generally is preferred to incorporate the inhibitor after the solid polymer is formed. In one method the solid polymer is recovered as powder, pellets, cylinders, spheres, sheets, rolls, bars, etc., and these may be commingled with the inhibitor in any suitable manner such as by partly melting the solid polymer and adding the inhibitor to the hot melt. This is readily accomplished, for example, by heating the solid polymer on the steam heated 2-roll mill of conventional commercial design and adding the inhibitor during this operation. The solid polymer containing the inhibitor is recovered in sheet form and may be fabricated in any desired manner. In another method the inhibitor is added in a Banbury mixer, etc., an extruder or in any other suitable manner. When fibers are desired, the inhibited polymer is recovered from the Banbury mixer and is extruded through a spinneret.

The inhibitor is utilized as such or is prepared as a solution in a suitable solvent including alcohols, and particularly methanol, ethanol, propanol, butanol, etc, hydrocarbons and particularly benzene, toluene, xylenes, cumene, etc. However, the solvent must not be detrimental to the polymer plastic and, therefore, a preferred solvent comprises the same solvent used during the manufacture or working of the polymer. It is understood that the inhibitor also may be used along with other additives incorporated in polymer plastics for various purposes. For example, in colored plastics carbon black is used in a concentration of below about 5% by weight and generally of from about 1% to about 3% by weight. Similarly, pigments, zinc oxide, titanium oxide, antimony oxide, etc., may be incorporated in polymer plastics, the oxides usually being employed in a concentration of from about 2% to about 10% by weight. In many cases, silicates, dyes and/or fillers also are incorporated in the polymer. Some of the dyes and pigments most commonly used are enumerated below.

The polymers such as polyolefines, especially polypropylene and polystyrene, will contain various greens and blues as phthalocyanines, ultramarine, indanthrone and cobalt blue. Polyesters and polystyrene may contain iron blue, chrome green, chromium oxide or hydrated chromium oxide. Nylon and polyurethanes may contain ultramarine, phthalocyanines, etc. Polyvinylchloride, polyacrylates, etc., may contain cobalt blues, indanthrones, ultramarine, chromium oxide, hydrated chromium oxide, phthalocyanines, etc.

Various orange and yellow dyes and/or pigments are being incorporated in polymers. Cadmium sulfoselenides, iron oxide, vat colors, etc., are being incorporated in polyethylene, polypropylene, polystyrene, polyurethanes, nylon, polyvinylchloride, polyacrylates, etc. Chrome yellow may be incorporated in polyesters, polyvinylchloride, polyacrylics and polystyrene. Chrome orange pigment is used in polyesters, polyurethanes, polyethylene, polyvinylchloride, polyacrylates, etc. Molybdate orange pigment may be incorporated in polyesters, polyurethanes, polyethylene, polypropylene, polyvinylchloride, polyacrylics, polystyrene, etc. Benzidine yellow and benzidine yellow xylidide are being used in polyethylene, polypropylene, polyvinylchloride, polyacrylics, polystyrene, etc. Hansa yellow pigment may be used in polyacrylics and polystyrene. Nickel azo (green-gold) may be used in polyurethanes, polyethylene, polyvinylchloride, polyacrylics and polystyrene.

Polyethylene, polyvinylchloride, polyacrylics, polystyrene, etc., may be compounded with Strontium yellow. Polyethylene, polyacrylics, polystyrene, etc., are compounded with zinc chromate. Nickel-Ti yellows are used with polyethylene, polypropylene, polyvinylchloride, polyacrylics, polystyrene, etc.

Various violet, maroon and red colors are used in plastics. Quinacridone Bon (2B-Ca salt), pigment scarlet, helio Bordeaux, Thioindigo, high molecular weight Desazo red, vat reds, etc, are used in polyesters, polyurethanes, polyethylene, polypropylene, polyvinylchloride and polystyrene.

Bon (2B-Mn salt), Lithol Rubine, Alizarine maroon, red lake C, naphthol, pyrozolone, etc. may be used in polyesters, polyvinylchloride, polyacrylics or polystyrene.

The novel compounds of the present invention function in many cases, in addition to stabilizing the polymer, as stabilizers for some of the above mentioned pigments or dyes.

In addition to pigments and dyes, the polymers may contain antistatic agents, various plasticizers of ester, polyester, epoxy, metalo-organic, phosphate, etc., type. In addition to stabilizing the polymer, the inhibitors are also effective in stabilizing ester and polyester type plasticizers, etc.

It is understood that the inhibitor of the present invention also may be used along with other inhibitors or other ultraviolet light stabilizers. The other inhibitors generally will be of the phenolic or amine type and may include phenyl - alpha - naphthylamine, phenyl - beta-naphthylamine, phenothiazine, thio-$\beta$-naphthol, dialkylated phenols, trialkylated phenols, diphenyl-p-phenylenediamine, dinaphthyl p-phenylenediamine, Salol (salicylic acid esters), p-octylphenylsalicylate, various phosgene alkylated phenol reaction products as various alkoxyalkyldihydroxybenzophenones, polyalkyldihydroxybenzophenones, tetrahydroxybenzophenones, etc. Other ultraviolet light stabilizers include nickel-bis-dithiocarbamates, nickel-bis-dihydroxypolyalkylphenol sulfides, dilauryl-$\beta$-mercaptodipropionate, dihydroxytetraalkyl sulfides, dihydroxytetraalkyl methanes, etc. Various trithiophosphites as trilaurylthiophosphite, trialkylphosphites, etc.

The following examples are introduced to illustrate further the novelty and utility of the present invention but not with the intention of unduly limiting the same.

*Example I*

The novel compound of this example is salicylal-p-aminodiphenylamine and was prepared as follows: 368 g. (2 moles) of p-aminodiphenylamine were refluxed with 244 g. (2 moles) of salicylaldehyde in 800 g. of benzene. 34.6 cc. of water were collected. The precipitate was recrystallized from methanol and salicylal-p-aminodiphenylamine was recovered as reddish brown crystals having a melting point of 120°–121° C.

*Example II*

The novel compound of this example is the coordination complex of nickel and salicylal-p-aminodiphenylamine and was prepared as follows: 288 g. (1 mole) of salicylal-p-aminodiphenylamine, prepared in the manner described in Example I, were commingled with 400 g. of methanol. Sixty-five g. (1 mole) of potassium hydroxide dissolved in 200 g. of methanol were added to the above mixture and then 125 g. (0.5 mole) of nickelous acetate dissolved in 300 g. of methanol were added dropwise. The reaction mixture was refluxed for two hours. The resultant precipitate was digested with hot benzene, recrystallized from toluene and filtered. Nickel bis-salicylal-p-aminodiphenylamine was recovered as brown crystals, having a melting point of 155°–160° C. and a nickel content of 8.34%. The toluene solution yielded a first cut containing 8.01% nickel. Precipitation with Skellysolve B yielded nickel bis-salicylal-p-aminodiphenylamine containing 9.39% nickel. The theoretical for nickel bis-salicylal-p-aminodiphenylamine is 9.3% nickel.

*Example III*

The novel compound of this example is salicylal-o-aminodiphenylamine and was prepared as follows: 138 g. (0.75 mole) of o-aminodiphenylamine were refluxed with 91.5 g. (0.75 mole) of salicylaldehyde in 300 g. of benzene. 12.5 cc. of water was collected after seven hours of refluxing. The benzene was removed by evaporation and the precipitate was crystallized from methanol. Salicylal-o-aminodiphenylamine was recovered as yellow crystals, having a melting point of 79–81° C. and a basic nitrogen content of 3.5 meq./g.

*Example IV*

The coordination complex of this example is nickel bis-salicylal-o-aminodiphenylamine and was prepared as follows: 36 g. (⅛ mole) of salicylal-o-aminodiphenylamine were refluxed with 8.12 g. (⅛ mole) of potassium hydroxide dissolved in 100 g. of methanol, followed by the addition of 15.55 g. (1/16 mole) of nickelous acetate tetrahydrate dissolved in 100 g. of methanol. Refluxing was continued for two hours and the product was recovered by filtration, washed with water and methanol. Nickel bis-salicylal-o-aminodiphenylamine was recovered as olive-drab crystals and had a nickel content of 10% which corresponds to the theoretical nickel content of 9.3%.

*Example V*

The novel compound of this example is o-vanillal-p-aminodiphenylamine and was prepared as follows: 184 g. (1 mole) of p-aminodiphenylamine were refluxed with 152 g. (1 mole) of ortho-vanillin in 400 g. of benzene. 16.2 cc. of water was collected after slightly over three hours of refluxing. The precipitate was recrystallized from toluene, and o-vanillal-p-aminodiphenylamine was recovered as reddish brown crystals having a melting point of 144°–146° C. and a basic nitrogen content of 3.14 meq./g.

*Example VI*

The nickel coordination complex of o-vanillal-p-aminodiphenylamine was prepared as follows: 0.1 mole of o-vanillal-p-aminodiphenylamine, prepared as described in Example V, was dissolved in 100 g. of methanol and refluxed with 0.1 mole of potassium hydroxide dissolved in 100 g. of methanol, followed by the addition of 0.05 mole of nickelous acetate dissolved in 100 g. of methanol. After 3.5 hours of refluxing, the solution was filtered and the precipitate was washed and recovered. The resultant nickel bis-o-vanillal-p-aminodiphenylamine was recovered as olive-green crystals having a melting point of 135°–137° C. Upon analysis, the percent of nickel was found to be 8.14% which corresponds to the theoretical nickel content of 8.42%.

*Example VII*

The coordination complex of this example is cobalt bis-salicylal-p-aminodiphenylamine and was prepared as follows: 36 g. (1.8 mole) of salicylal-p-aminodiphenylamine, prepared as described in Example I, was dissolved in 100 g. of methanol and was refluxed with 8.12 g. (⅛ mole) of potassium hydroxide dissolved in 100 g. of water, followed by the addition of 10.8 g. (1/16 mole) of cobaltous nitrate monohydrate commingled with 200 g. of water. Cobalt bis-salicylal-p-aminodiphenylamine was recovered as a vermilion red precipitate which was washed with hot water and methanol. Analysis of the product showed 9.39% cobalt which corresponds to the theoretical 9.35 cobalt.

*Example VIII*

The coordination complex of this example is zinc bis-salicylal-p-aminodiphenylamine and was prepared as follows: 36 g. (⅛ mole) of salicylal-p-aminodiphenylamine, prepared as described in Example I, were dissolved in 100 g. of methanol and refluxed with 8.12 g. (⅛ mole) of potassium hydroxide dissolved in 100 g. of water. 8.52 g. less of zinc chloride dissolved in 100 g. of water then were added dropwise to the refluxing mixture. Zinc bis-salicylal-p-aminodiphenylamine was recovered as a yellow precipitate which was washed with hot water and methanol. The product analyzed 10.95% by weight of zinc which corresponds to the theoretical zinc content of 10.23%.

*Example IX*

The coordination complex of this example is cadmium salicylal-p-aminodiphenylamine and was prepared as follows: 36 g. (⅛ mole) of salicylal-p-aminodiphenylamine, prepared as described in Example I, was refluxed with 8.12 g. (⅛ mole) of potassium hydroxide in 200 g. of methanol. 33.25 g. (⅛ mole) of cadmium acetate dissolved in 200 g. of methanol then was added drop-wise to the refluxing mixture. The precipitate was removed by filtering, washed with hot water and methanol. Cadmium salicylal-p-aminodiphenylamine was recovered as a greenish yellow material having a cadmium content of 18.57%.

*Example X*

The coordination complex of this example is cadmium bis-salicylal-o-aminodiphenylamine and was prepared as follows: 36 g. (⅛ mole) of salicylal-o-aminodiphenylamine, prepared as described in Example III, was refluxed with 8.12 g. (⅛ mole) of potassium hydroxide in 100 g. of methanol, followed by the addition drop-wise of 16.62 g. (1/16 mole) of cadmium acetate dihydrate dissolved in 100 g. of methanol. Cadmium bis-salicylal-o-aminodiphenylamine was recovered as a precipitate and was found to contain 26.6% cadmium.

*Example XI*

Various o - hydroxybenzalaminodiphenylamines and metal coordination complexes were evaluated in solid polypropylene. The polypropylene is available commercially from Montecatini under the trade name of "Moplen." The polypropylene is believed to have substantially the properties set forth in Table I.

TABLE I

| | |
|---|---|
| Specific gravity | 0.910–0.920 |
| Refraction index $n_{25}{}^d$ | 1.510 |
| Heat distortion temperature: | |
| At 66 p.s.i. load °F | 240 |
| At 264 p.s.i. load °F | 150 |
| Tensile yield strength (ASTM D–638–58T) (0.2" per min.), p.s.i. | 4700 |
| Total elongation, percent | 300–400 |
| Stiffness flexural (ASTM D–747–50) 105 p.s.i. | 1.8 |
| Shore hardness (ASTM D–676–55T) | 74D |

The polypropylene was evaluated in three different standard methods. In one method, samples of the polypropylene, with and without inhibitor, were evaluated in an Atlas type DL–TS Weather-Ometer. The Weather-Ometer may be operated with or without the use of water sprays to simulate accelerated moist weathering. In the present runs, the water sprays were not used, thereby simulating and accelerating the effect of hot airy weathering, a much more severe condition. Polypropylene pellets were milled in a 2-roll heated mill of conventional commercial design and the inhibitor incorporated in the samples during the milling. The samples were pressed into sheets of 17 mil thickness and cut into plaques of 1⅜" x 1½". The plaques then were inserted into plastic holders, affixed onto a rotating drum and exposed to carbon arc rays at about 125° F. in the Weather-Ometer. Periodically samples of the polypropylene were subjected to infrared analysis and the carbonyl band at 1715 cm.$^{-1}$ was determined. As hereinbefore set forth, the formation of carbonyl groups is an indication of deterioration of the polyolefin. The higher intensity of the carbonyl band indicates a higher carbonyl concentration and accordingly increased deterioration.

Samples of the polypropylene also were evaluated by outdoor exposure. The plaques of polyolefin prepared in the above manner were exposed to weathering on a rack placed outdoors at Des Plaines, Illinois. Here again, the samples were analyzed for carbonyl formation in the manner described in the previous paragraph.

mercury and the differential pressure is periodically determined. The Induction Period is taken as the number of hours required to reach a differential pressure of 20 cm. Hg.

The results of evaluations in the Weather-Ometer, outdoor exposure and the induction periods are reported in the following table for a sample of the Moplen polypropylene wtih no added inhibitor and for samples containing various inhibitors.

TABLE II

| Additive | Weather-Ometer Carbonyl Content, Hours | | | | | | | Outdoor Exposure Carbonyl Content, Hours | | | | | | Induction Period, Hours |
|---|---|---|---|---|---|---|---|---|---|---|---|---|---|---|
| | 0 | 48 | 96 | 144 | 192 | 240 | 288 | 0 | 14 | 28 | 42 | 56 | 70 | |
| None | 161 | 951 | Brittle—Broken | | | | | 166 | 520 | 1,000+ | | | | 1 |
| 1% by weight of salicylal-p-aminodiphenylamine (Example I) | 174 | 147 | 168 | 162 | 190 | | 221 | 150 | 169 | 192 | | | | |
| 2% by weight of nickel bis-salicylal-p-amino-diphenylamine (Example II) | 147 | 147 | 166 | 175 | 177 | 232 | | 126 | 160 | 164 | | | | *537 |
| 1% by weight of nickel bis-salicylal-o-aminodiphenylamine (Example IV) | 158 | 118 | 207 | 249 | 352 | 547 | | 154 | 184 | 228 | | | | |
| 1% by weight of nickel bis-o-vanillal-p-aminodiphenylamine (Example VI) | 120 | 132 | 162 | 234 | 399 | | | 124 | 153 | 232 | | | | |
| 1% by weight of cobalt bis-salicylal-p-aminodiphenylamine (Example VII) | 129 | 138 | 144 | 155 | 152 | 207 | 182 | 137 | | 170 | | | | |
| 1% by weight of zinc bis-salicylal-p-aminodiphenylamine (Example VIII) | 119 | 116 | 135 | 154 | 153 | 200 | 176 | 197 | 116 | 178 | | | | |

*At an inhibitor concentration of 0.15% by weight.

Samples of the polypropylene also were evaluated by a thermal oxidation method. This method is described in a paper by W. L. Hawkins et al. of the Bell Telephone Laboratories, Inc., entitled "The Effect of Carbon Black on Thermal Antioxidants for Polyethylene," which paper appeared in the Journal of Applied Polymer Science, vol. 1, issue 1, pages 21–42 (1949). The method used in this test was modified in that an electrically heated aluminum block rather than an oven was used to maintain the desired temperature and the oxygen absorption of the sample was determined manometrically rather than volumetrically. In this method samples of the polypropylene, weighing about 0.5 g. each, were placed in separate 8 ml. glass tubes and the tubes then were inserted into horizontal rows of openings located concentrically around the heater. The temperature is maintained at about 285° F. The glass tubing also was packed with glass wool and molecular sieves to absorb the gases. Each of the glass tubes is connected to individual manometers containing From the data in the above table, it will be seen that the polypropylene without inhibitor became brittle and broken in less than 100 hours in the Weather-Ometer and developed a carbonyl content of over 1000 in 28 days of outdoor exposure. In contrast, it will be noted from the data in the above table that all of the inhibitors of the present invention served to retard carbonyl formation in both the Weather-Ometer and outdoor exposure evaluations.

*Example XII*

Various inhibitors of the present invention also were evaluated in solid polyethylene. The polyethylene used in this example is a linear polyethylene of high density and marketed under the trade name of "Fortiflex H.D.C.$_2$" by the Celanese Corporation of America. These evaluations were made in the same manner as described in Example XI and the results are reported in the following table.

TABLE III

| Additive | Weather-Ometer Carbonyl Content, Hours | | | | | | | | Outdoor Exposure Carbonyl Content, Hours | | | | | Induction Period, Hours |
|---|---|---|---|---|---|---|---|---|---|---|---|---|---|---|
| | 0 | 48 | 96 | 144 | 192 | 240 | 288 | 624 | 0 | 14 | 28 | 42 | 56 | |
| None | 22 | 142 | 104 | 622 | 810 | Brittle—Broken | | | 24 | 76 | 142 | 199 | 259 | 11 |
| 1% by weight of salicylal-p-aminodiphenylamine (Example I) | 15 | 78 | | | | | | | 16 | | | | | |
| 2% by weight of nickel bis-salicylal-p-aminodiphenyl-amine (Example II) | 10 | | 17 | 21 | 22 | 19 | 18 | 36 | 10 | 14 | 16 | 26 | 17 | *913 |
| 2% by weight of nickel bis-salicylal-o-aminodiphenyl-amine (Example IV) | 5 | 4 | 0 | 0 | 12 | 10 | 15 | | 40 | 9 | 14 | 26 | | |
| 1% by weight of o-vanillal-p-aminodiphenylamine (Example V) | 36 | 12 | 27 | 26 | 43 | 33 | 41 | | 32 | 68 | 68 | | | |
| 2% by weight of nickel bis-o-vanillal-p-aminodiphenyl-amine (Example VI) | 0 | 0 | 0 | 0 | 0 | 3 | 10 | | 0 | 0 | | 21 | | *260 |
| 2% by weight of cobalt bis-salicylal-p-aminodiphenyl-amine (Example VII) | 0 | 0 | 0 | 0 | 0 | 0 | 0 | | 0 | 0 | 0 | 4 | | |
| 2% by weight of zinc bis-salicylal-p-aminodiphenylamine (Example VIII) | 0 | 0 | 0 | 0 | 0 | 0 | 1 | | 0 | 0 | 0 | 8 | | |

*At an inhibitor concentration of 0.075% by weight.

From the data in the above table it will be noted that a number of inhibitors of the present invention were outstanding in reducing carbonyl formation in the polyethylene. It is noteworthy that the induction period of the sample of polyethylene containing nickel bis-salicylal-p-aminodiphenylamine in a concentration of only 0.075% by weight was 913 hours in contrast to the 11 hour induction period of the polyethylene not containing an inhibitor.

*Example XIII*

Nickel salicylal-p-aminodiphenylamine is used as an inhibitor in a branched polyethylene available commercially from Union Carbide Corporation under the trade name of "DFD-0100 Polyethylene." Typical properties of this polyethylene are listed in the following table.

TABLE IV

| | |
|---|---|
| Specific gravity | 0.92–0.96 |
| Density at 73° F. | 0.922 |
| Melt index, g. per 10 min. | 2 |
| Tensile strength (Method D882) p.s.i.: | |
| Machine direction | 2700 |
| Transverse direction | 2300 |
| Ultimate elongation (Method D882) percent: | |
| Machine direction | 350 |
| Transverse direction | 500 |
| Stiffness at 1% elongation and 73° F. (Method D1530) p.s.i. | 32,000 |

When evaluated in the Weather-Ometer as described in Example XI, this polyethylene developed a carbonyl content of greater than 1000 in 96 hours. When evaluated by outdoor exposure, this polyethylene developed a carbonyl content of over 500 within 70 days. The induction period of the uninhibited sample of this polyethylene is 7.

1.75% by weight of nickel bis-salicylal-p-aminodiphenylamine is incorporated in another sample of the above polyethylene and serves to considerably decrease the carbonyl development when evaluated both in the Weather-Ometer and by outdoor exposure. The induction period of the polyethylene also is considerably increased by the incorporation of the inhibitor in the polyethylene.

*Example XIV*

Zinc bis-salicylal-p-aminodiphenylamine is utilized as an inhibitor in solid polybutylene. The inhibitor is incorporated by hot melt addition of the inhibitor to the polybutylene being heated and pressed on a conventional 2-roll steam heated mill. The polybutylene sheets then are heat compressed to a thickness of 20 mils, cut into plaques of 1½" x 1½" and mounted in plastic holders. The plaques are evaluated both in the Weather-Ometer and by outdoor exposure in the manner hereinbefore described in detail. The induction period of the samples of polybutylene are obtained in the thermal oxidation method heretofore described. Zinc bis-salicylal-p-aminodiphenylamine serves to effectively inhibit carbonyl development and to considerably increase the induction period of the polybutylene.

*Example XV*

The coordination complex of this example is nickel bis-salicylal-o-aminodiphenylamine and is prepared in substantially the same manner as described in Example IV. This compound is used as an inhibitor in polyvinyl chloride plastic. Here again the inhibitor is incorporated by partly melting the polyvinyl chloride plastic and incorporating the inhibitor in the hot melt. The inhibitor is used in a concentration of 1% by weight, and the inhibited polyvinyl chloride plastic is of increased resistance to oxidative and ultraviolet light deterioration.

*Example XVI*

The coordination complex inhibitor of this example is cobalt bis-salicylal-p-aminodiphenylamine and is prepared in substantially the same manner as described in Example VII. It is used as an inhibitor in nylon. The inhibitor is incorporated in a Banbury mixer and the nylon is formed into fibers in a spinneret. The resultant nylon containing the inhibitor is of improved resistance to air and ultraviolet light.

*Example XVII*

The inhibitor of this example is o-vanillal-p-aminodiphenylamine and is prepared in substantially the same manner as described in Example V. It is used as an inhibitor in elastomers. The elastomer of this example is SBR rubber and the inhibitor, in a concentration of 2% by weight is incorporated therein during the final stages of processing in the Banbury mixer. Incorporation of the inhibitor serves to inhibit deterioration of the rubber due to air and ultraviolet light.

*Example XVIII*

Two parts by weight per hundred of the additives described in Examples I, II, III, IV, V VI, IX and X were aged in natural rubber (smoked sheet) at 90° C. in test tubes provided with two openings to circulate air by means of convection. The natural rubber (smoked sheet) had the following formula:

| | Parts per hundred |
|---|---|
| Smoked sheet | 100.00 |
| Carbon black | 45.00 |
| Zinc oxide | 3.60 |
| Stearic acid | 3.00 |
| Sulfur | 2.50 |
| Santocure | 0.75 |
| Additive of invention | 2.00 |

Ultimate elongation, 300% modulus and tensile strength were obtained after one, two, four and seven days of aging at 90° C. and are reported in the following table.

TABLE V

| Additive | Ultimate Elongation, Days | | | | | 300% Modulus, Days | | | | | Tensile Strength, Days | | | | |
|---|---|---|---|---|---|---|---|---|---|---|---|---|---|---|---|
| | 0 | 1 | 2 | 4 | 7 | 0 | 1 | 2 | 4 | 7 | 0 | 1 | 2 | 4 | 7 |
| None | 415 | 350 | 275 | 235 | 180 | 2,220 | 2,255 | | | | 3,320 | 2,570 | 1,790 | 1,145 | 750 |
| Salicylal-p-aminodiphenylamine (Example I) | 480 | 440 | 395 | 325 | 285 | 1,985 | 2,260 | 2,280 | 2,525 | | 3,495 | 3,510 | 3,040 | 2,775 | 2,360 |
| Nickel bis-salicylal-p-aminodiphenylamine (Example II) | 440 | 395 | 370 | 305 | 280 | 2,245 | 2,485 | 2,630 | 2,645 | | 3,690 | 3,425 | 3,170 | 3,000 | 2,435 |
| Salicylal-o-aminodiphenylamine (Example III) | 460 | 320 | 265 | 205 | | 2,045 | 1,735 | | | | 3,420 | 1,920 | 1,085 | 525 | |
| Nickel bis-salicylal-o-aminodiphenylamine (Example IV) | 425 | 305 | 285 | 205 | | 2,085 | 2,010 | | | | 3,260 | 2,060 | 1,600 | 735 | |
| o-Vanillal-p-aminodiphenylamine (Example V) | 480 | 440 | 395 | 335 | 310 | 1,880 | 2,135 | 2,165 | 2,225 | 2,170 | 3,350 | 3,325 | 3,055 | 2,585 | 2,765 |
| Nickel bis-o-vanillal-p-aminodiphenylamine (Example VI) | 475 | 430 | 390 | 350 | 310 | 2,040 | 2,235 | 2,305 | 2,470 | 2,320 | 3,515 | 3,360 | 3,095 | 2,915 | 2,350 |
| Cadmium bis-salicylal-p-aminodiphenylamine (Example IX) | 450 | 400 | 370 | 310 | 250 | 2,000 | 2,295 | 2,350 | 2,480 | | 3,360 | 3,260 | 2,960 | 2,640 | 2,500 |
| Cadmium bis-salicylal-o-aminodiphenylamine (Example X) | 470 | 405 | 380 | 325 | 240 | 1,990 | 2,290 | 2,405 | 2,555 | | 3,610 | 3,285 | 3,145 | 2,800 | 2,420 |

The data in the above table illustrate that the ortho-hydroxybenzalaminodiphenylamines of the present invention are very potent oxidation, heat and aging inhibitors for rubber.

I claim as my invention:

1. A metal coordination complex of o-hydroxybenzal-aminodiphenylamine in which the metal is selected from the group consisting of nickel, copper, cobalt, antimony, cadmium, lead, tin, uranium, vanadium and zinc.
2. Nickel bis-salicylal-p-aminodiphenylamine.
3. Cobalt bis-salicylal-p-aminodiphenylamine.
4. Zinc bis-salicylal-p-aminodiphenylamine.

References Cited by the Examiner

UNITED STATES PATENTS

| | | | |
|---|---|---|---|
| 2,533,205 | 12/1950 | Chenicek | 44—73 |
| 2,615,860 | 10/1952 | Burgess | 260—429 |
| 3,008,921 | 11/1961 | Kline | 260—45.9 |
| 3,019,262 | 1/1962 | Ambelang | 260—566 |
| 3,133,952 | 5/1964 | Kline | 260—45.9 |

OTHER REFERENCES

Heucke, Justus Liebig's Annalen der Chemie, 255, pages 188–195 (1889).

Misra et al., Journal Indian Chemical Society, volume 37, No. 8, pages 481–482, August 1960.

TOBIAS E. LEVOW, *Primary Examiner.*

E. C. BARTLETT, H. M. S. SNEED,
*Assistant Examiners.*